United States Patent
Eatough et al.

(10) Patent No.: US 8,185,945 B1
(45) Date of Patent: May 22, 2012

(54) SYSTEMS AND METHODS FOR SELECTIVELY REQUESTING CERTIFICATES DURING INITIATION OF SECURE COMMUNICATION SESSIONS

(75) Inventors: David A. Eatough, Herriman, UT (US); Alan B. Butt, Orem, UT (US)

(73) Assignee: Crimson Corporation, Dover, DE (US)

( * ) Notice: Subject to any disclaimer, the term of this patent is extended or adjusted under 35 U.S.C. 154(b) by 826 days.

(21) Appl. No.: 11/070,475

(22) Filed: Mar. 2, 2005

(51) Int. Cl.
*G06F 9/00* (2006.01)
*G06F 15/16* (2006.01)
*G06F 17/00* (2006.01)

(52) U.S. Cl. .......... 726/14; 713/150; 713/156; 713/168; 713/173; 713/193; 713/176; 709/203; 709/214; 709/229; 726/2; 726/3; 726/4; 726/10; 726/11; 726/12

(58) Field of Classification Search .................. 370/389; 713/157, 201; 726/11, 10
See application file for complete search history.

(56) References Cited

U.S. PATENT DOCUMENTS

| | | | |
|---|---|---|---|
| 6,321,339 B1 | 11/2001 | French et al. | |
| 6,754,829 B1 | 6/2004 | Butt et al. | |
| 6,775,782 B1 | 8/2004 | Buros et al. | |
| 6,845,452 B1 * | 1/2005 | Roddy et al. | 726/11 |
| 7,085,817 B1 * | 8/2006 | Tock et al. | 709/217 |
| 7,395,424 B2 * | 7/2008 | Ashley et al. | 713/156 |
| 2002/0029200 A1 * | 3/2002 | Dulin et al. | 705/67 |
| 2002/0157019 A1 * | 10/2002 | Kadyk et al. | 713/201 |
| 2002/0191604 A1 * | 12/2002 | Mitchell et al. | 370/389 |
| 2003/0056094 A1 * | 3/2003 | Huitema et al. | 713/157 |
| 2003/0084311 A1 * | 5/2003 | Merrien et al. | 713/191 |
| 2003/0105952 A1 * | 6/2003 | Brabson et al. | 713/151 |
| 2003/0221126 A1 * | 11/2003 | Berman et al. | 713/201 |
| 2004/0030887 A1 * | 2/2004 | Harrisville-Wolff et al. | 713/155 |

* cited by examiner

*Primary Examiner* — Nathan Flynn
*Assistant Examiner* — Bryan Wright
(74) *Attorney, Agent, or Firm* — Austin Rapp & Hardman

(57) ABSTRACT

An exemplary method involves an SSL server receiving an SSL session request from an SSL client. It is determined whether the SSL client is going to use certificate-based authentication. This may involve identifying a port at which the SSL session request was received. Alternatively, this may involve identifying an IP address at which the SSL session request was received. Alternatively still, this may involve examining authentication information in the SSL session request. If the SSL client is going to use certificate-based authentication, a certificate is requested from the SSL client. If the SSL client is not going to use certificate-based authentication, the certificate is not requested from the SSL client.

14 Claims, 9 Drawing Sheets

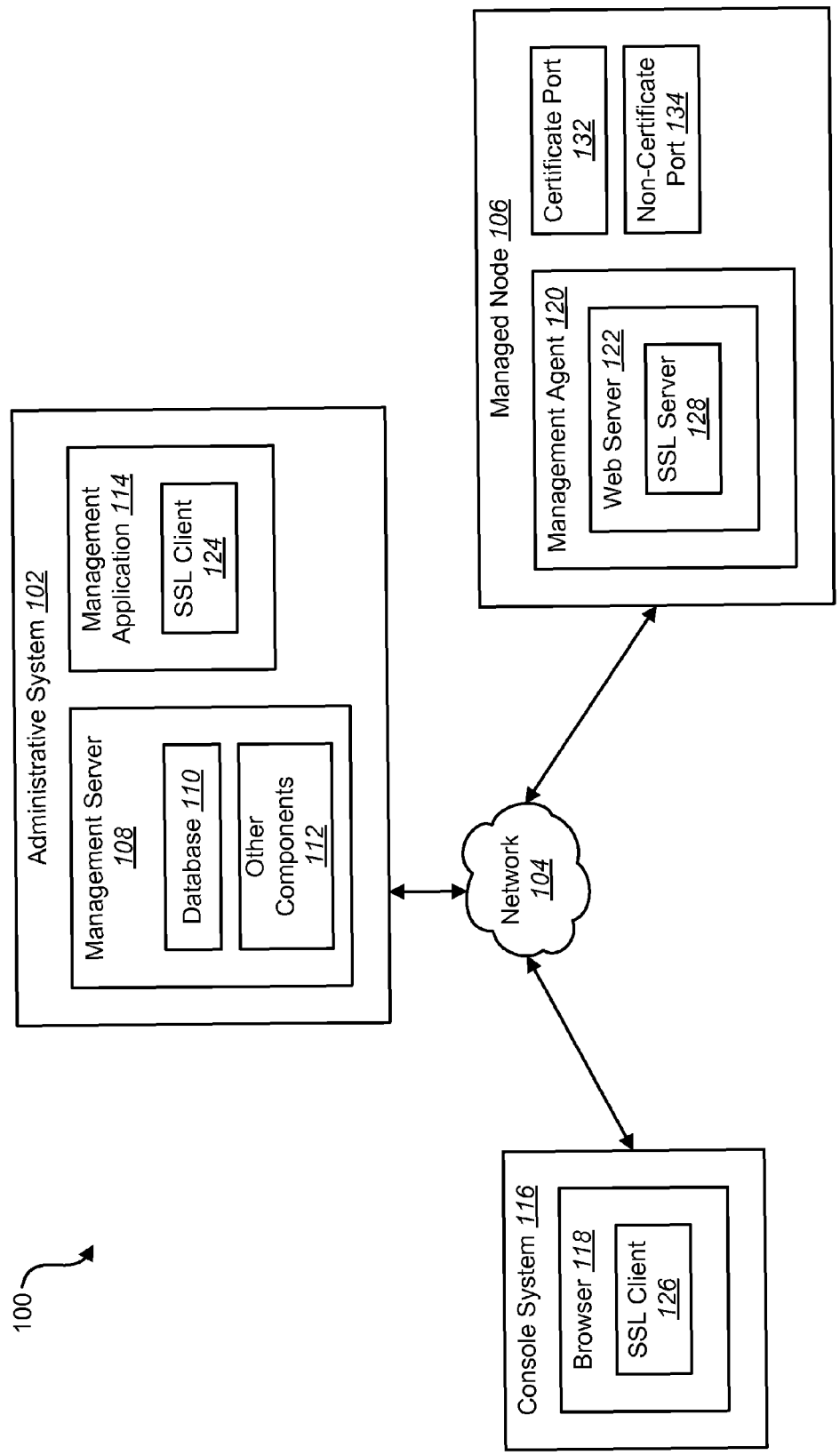

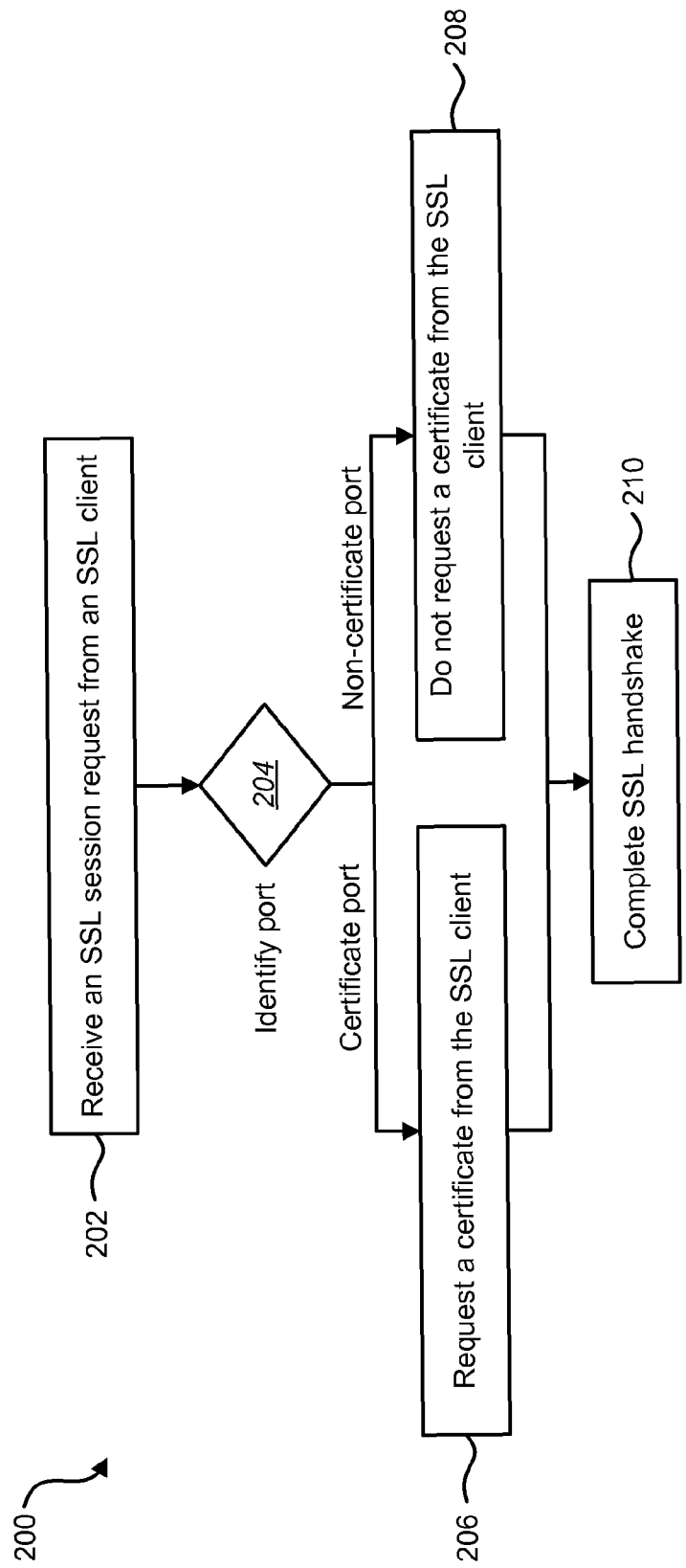

SYSTEMS AND METHODS FOR SELECTIVELY REQUESTING CERTIFICATES DURING INITIATION OF SECURE COMMUNICATION SESSIONS

TECHNICAL FIELD

The present invention relates generally to computer system administration. More specifically, the present invention relates to systems and methods for selectively requesting certificates during initiation of secure communication sessions.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software is continually being integrated into systems across the world.

Installing new computer hardware and/or software, or fixing problems with existing systems, may cause down-time during which the business or individual operates at a diminished level. Most individuals and businesses try to minimize computer problems so as to avoid down-time.

When a business or individual is trying to decide whether to make a change to a computer system, the concern about down-time may outweigh the cost of the installation or change in influencing the decision. The professional computer service industry which carries out and supports installations and upgrades has been rapidly expanding. However, even with such computer professional support, the threat of such down-time coupled with the costs of such professional services is a concern.

As corporate performance and end-user productivity have become increasingly dependent on computers, computer support personnel are continuously under pressure to accomplish more with existing or reduced staff head counts. They are also under pressure to perform tasks as efficiently as possible which may include minimizing effects to existing computer systems and networks.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 1 illustrates an exemplary system in which some embodiments may be practiced;

FIG. 2 illustrates an exemplary method that may be performed by the SSL server in the system of FIG. 1 when an SSL session request is received from an SSL client;

DETAILED DESCRIPTION

Figure 2A:
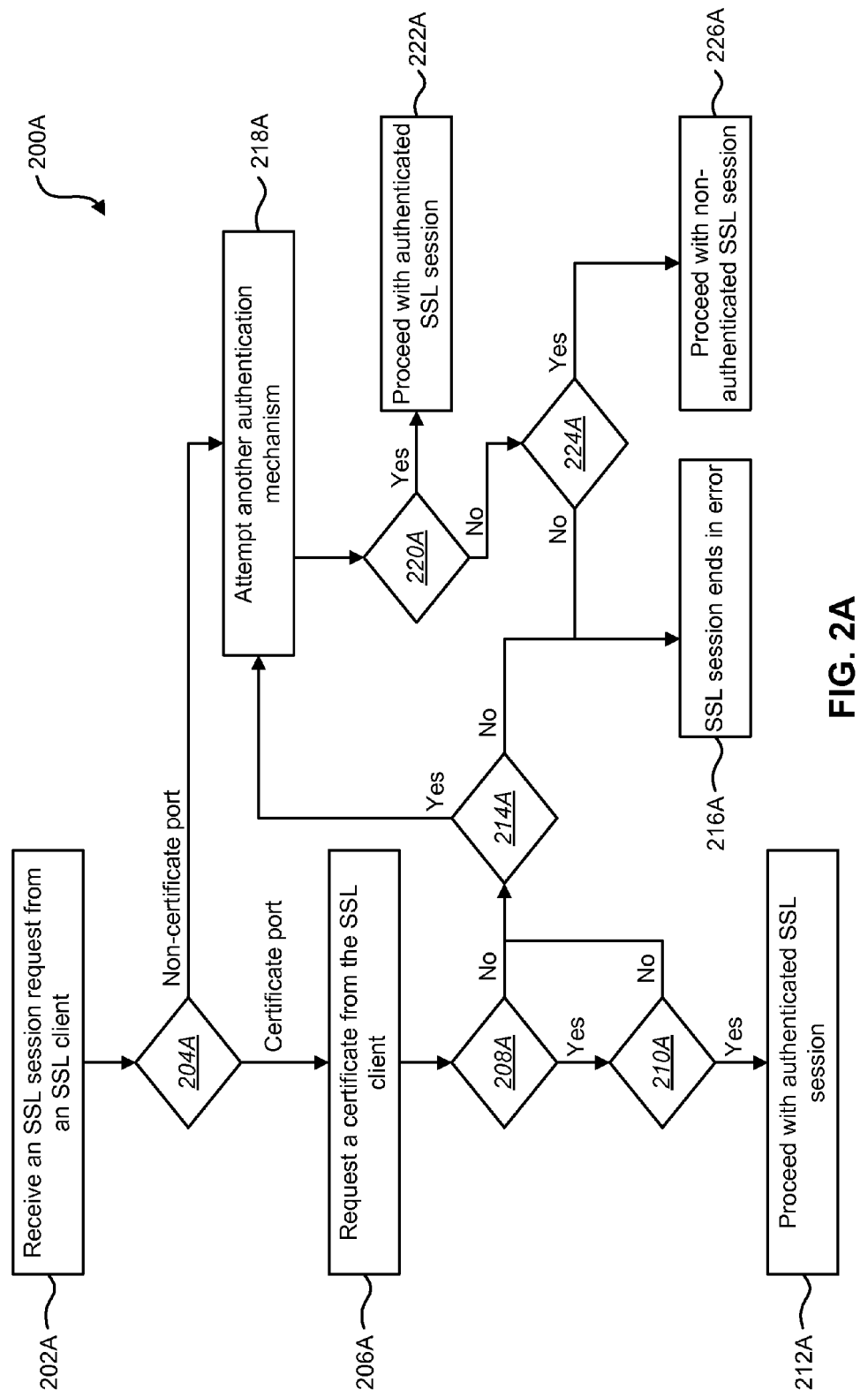
FIG. 2A illustrates in greater detail the operation of the SSL server in some embodiments.

A method for selectively requesting certificates during initiation of secure communication sessions is disclosed. The method involves receiving from a client a request to initiate a secure communication session. The method also involves determining whether the client is going to use certificate-based authentication. If the client is going to use certificate-based authentication, a certificate is requested from the client. If the client is not going to use certificate-based authentication, a certificate is not requested from the client. In some embodiments, the secure communication session is a secure sockets layer (SSL) session.

In some embodiments, the step of determining whether the client is going to use certificate-based authentication involves identifying a port at which the request was received. Alternatively, the step of determining whether the client is going to use certificate-based authentication may involve identifying an IP address at which the request was received. Alternatively still, the step of determining whether the client is going to use certificate-based authentication may involve examining authentication information in the request.

The method may be implemented in a computer system. The computer system may be a managed node in a computer network. The client may be located on an administrative system for the computer network. More specifically, the client may be included in a management application on the administrative system. Alternatively, the client may be located on a console system that is also connected to the computer network. More specifically, the client may be included in a browser on the console system.

A computer system that is configured to implement a method for selectively requesting certificates during initiation of secure communication sessions is also disclosed. The computer system includes a processor and memory in electronic communication with the processor. Instructions are stored in the memory. The instructions are executable to implement a method that involves receiving from a client a request to initiate a secure communication session. The method also involves determining whether the client is going to use certificate-based authentication. If the client is going to use certificate-based authentication, a certificate is requested from the client. If the client is not going to use certificate-based authentication, a certificate is not requested from the client.

In some embodiments, the computer system also includes at least one certificate port that is designated to receive secure communication session requests from clients that will use certificate-based authentication, and at least one non-certificate port that is designated to receive secure communication session requests from clients that will not use certificate-based authentication. In such embodiments, the step of determining whether the client is going to use certificate-based authentication may involve determining whether the request was received at a certificate port or a non-certificate port.

Alternatively, the computer system may include at least one certificate IP address that is designated to receive secure communication session requests from clients that will use certificate-based authentication, and at least one non-certificate IP address that is designated to receive secure communication session requests from clients that will not use certificate-based authentication. In such embodiments, the step of determining whether the client is going to use certificate-based authentication may involve determining whether the request was received at a certificate IP address or a non-certificate IP address.

Alternatively still, authentication information may be included in the request from the client. In such embodiments, the step of determining whether the client is going to use certificate-based authentication may involve examining the authentication information in the request.

A computer-readable medium comprising executable instructions for selectively requesting certificates during initiation of secure communication sessions is also disclosed. The method involves receiving from a client a request to initiate a secure communication session. The method also involves determining whether the client is going to use certificate-based authentication. If the client is going to use certificate-based authentication, a certificate is requested from the client. If the client is not going to use certificate-based authentication, a certificate is not requested from the client.

Various embodiments of the invention are now described with reference to the Figures, where like reference numbers indicate identical or functionally similar elements. It will be readily understood that the embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Those skilled in the art will appreciate that many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, those skilled in the art will recognize that such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 illustrates an exemplary system 100 in which some embodiments may be practiced. An administrative computer system 102 is connected to a computer network 104, such as a corporate local area network (LAN). The administrative system 102 is used to manage other computer systems that are also connected to the computer network 104. These other computer systems will be referred to herein as "managed nodes." For simplicity, only a single managed node 106 is shown in the system 100 of FIG. 1. Of course, the systems in which embodiments disclosed herein are practiced may include many additional managed nodes.

The administrative system 102 includes a management server 108. The management server 108 may include a database 110 of information. The management server 108 may also include various other components 112 that are configured to perform tasks such as scheduling, handling alerts, and so forth. An example of a management server 108 that may be used with embodiments disclosed herein is the LANDesk® System Manager.

The administrative system 102 also includes a management application 114. The management application 114 may be used to perform various tasks related to the management of the computer network 104, such as remote control, software distribution, software license monitoring, operating system imaging and migration, IT asset management, problem resolution, and so forth. As part of performing these tasks, the management application 114 may connect to the management server 108 and query the management server 108 for information. An example of a management application 114 that may be used is the console application for the LANDesk® System Manager.

To enable a user of the administrative system 102 to perform management tasks via the management application 114, the managed node 106 includes a management agent 120. The management agent 120 performs management-related tasks in response to requests from the management application 114.

A console system 116 is also connected to the computer network 104. The console system 116 includes a browser 118. Like the management application 114, the browser 118 may be used to perform management tasks related to the management of the computer network 104. As part of performing these tasks, the management application 114 may connect to the management server 108 and query the management server 108 for information. The browser 118 may be a standard web browser, such as Microsoft Internet Explorer®, Netscape Navigator®, or the like.

To enable a user of the administrative system 102 to perform management tasks via the browser 118, the managed node 106 includes a web server 122. The web server 122 may be part of the management agent 120.

It may be desirable for communication between the managed node 106 and either the administrative system 102 or the console system 116 to be secured in some way. Typically, before the managed node 106 and the administrative system 102 or the console system 116 exchange data, a secure communication session is set up between these systems. Once a secure communication session has been established, then data may be exchanged in a secure fashion.

The term secure communication session, as used herein, refers to a communication session in which the data that is being exchanged is secured in some way. Systems may establish a secure communication session in accordance with a security protocol, such as the secure sockets layer (SSL) protocol. A secure communication session that is established in accordance with the SSL protocol may be referred to herein as an SSL session.

In the discussion that follows, it will be assumed that secure communication sessions are established using the SSL protocol. However, in some embodiments security protocols other than the SSL protocol may be used.

To facilitate use of the SSL protocol, the administrative system 102 includes an SSL client 124. The SSL client 124 may be included in the management application 114. In other words, the SSL client 124 functionality may be performed by the management application 114. The console system 116 also includes an SSL client 126. The SSL client 126 on the console system 116 may be included in the browser 118. The managed node 106 includes an SSL server 128, which may be included in the web server 122.

Many security protocols, such as the SSL protocol, require authentication as part of setting up a secure communication session. An SSL session begins with an exchange of messages that is sometimes referred to as the "SSL handshake." The SSL client initiates an SSL session by sending an SSL session request message to an SSL server. This SSL session request message is sometimes referred to as a "client hello" message. In response, the SSL server sends a response message to the SSL client. This response message is sometimes referred to as a "server hello" message. The response message sent by the SSL server may include a request that the SSL client may optionally send a certificate to the SSL server for authentication purposes. It is not necessary that the SSL client provide a certificate; however, the SSL client may provide a certificate for authentication. If the SSL client does not provide a certificate for authentication, the SSL client authenticates using some other mechanism. For example, the SSL client may use operating system-specific authentication, such as Microsoft Windows NT LAN Manager (NTLM). This may involve providing a username and password.

In the system 100 shown in FIG. 1, the SSL client 124 on the administrative system 102 authenticates with the managed node 106 using a certificate. However, the SSL client 126 on the console system 116 does not use a certificate in order to authenticate with the managed node 106. Instead, the SSL client 126 on the console system 116 authenticates using some other mechanism, such as providing a username and password.

Some known SSL servers are configured to always request a certificate from an SSL client during the SSL handshake. In response to such a request, some known SSL clients cause a dialog box to be displayed to the user which asks the user to select a certificate to be used.

Because the SSL client 126 on the console system 116 does not use a certificate in order to authenticate with the managed node 106, it is not desirable for the above-described dialog box to be displayed to the user of the console system 116 during initiation of an SSL session between the console system 116 and the managed node 106. If such a dialog box were presented to the user of the console system 116, the user might be required to press a "Cancel" button (or another similar button) in order to proceed. This might be irritating to some users. In addition, some users might be confused and think that a certificate is required in order to proceed.

In the system 100 of FIG. 1, the SSL server 128 that is running on the managed node 106 is configured to prevent the above-described dialog box from being displayed on the console system 116, thereby improving the experience of the user of the console system 116 during initiation of an SSL session. Advantageously, the SSL server 128 is also configured so that the administrative system 102 may continue to use certificate-based authentication.

To accomplish this, the SSL server 128 selectively requests certificates from SSL clients. More specifically, the SSL server 128 differentiates between SSL session requests that are received from SSL clients that are configured for certificate-based authentication and those that are received from SSL clients that are configured for other kinds of authentication. In other words, the SSL server 128 behaves differently depending on whether an SSL session is being established with an SSL client that is going to use certificate-based authentication or with an SSL client that is not going to use certificate-based authentication. If an SSL session is being established with an SSL client that is going to use certificate-based authentication (e.g., the SSL client 124 on the administrative system 102), the SSL server 128 requests a certificate from the SSL client. However, if an SSL session is being established with an SSL client that is not going to use certificate-based authentication (e.g., the SSL client 126 on the console system 116), the SSL server 128 does not request a certificate from the SSL client.

In the illustrated embodiment, this functionality is achieved by designating different ports on the managed node 106 to receive different types of SSL session requests. In particular, one port 132 on the managed node 106 is designated to receive SSL session requests from SSL clients that will use certificate-based authentication, such as the SSL client 124 on the administrative system 102. This port 132 may be referred to herein as a certificate port 132. In addition, another port 134 on the managed node 106 is designated to receive SSL session requests from SSL clients that will not use certificate-based authentication, such as the SSL client 126 on the console system 116. This port 134 may be referred to herein as a non-certificate port 134.

The SSL clients 124, 126 within the system 100 are configured to send SSL session requests to the appropriate port for the type of authentication that will be used. More specifically, the SSL client 124 on the administrative system 102 is configured to send SSL session requests to the certificate port 132. The SSL client 126 on the console system 116 is configured to send SSL session requests to the non-certificate port 134.

FIG. 2 illustrates an exemplary method 200 that may be performed by the SSL server 128 when an SSL session request is received 202 from an SSL client. In response to receiving the SSL session request, the SSL server 128 identifies 204 the port at which the request was received.

If the request was received at the certificate port 132, it may be inferred that the request was sent from an SSL client that is going to use certificate-based authentication, such as the SSL client 124 on the administrative system 102. Therefore, the SSL server 128 requests 206 a certificate from the SSL client. However, if the request was received at the non-certificate port 134, it may be inferred that the request was sent from an SSL client that is not going to use certificate-based authentication, such as the SSL client 126 on the console system 116. Therefore, the SSL server 128 does not request 208 a certificate from the SSL client. The SSL server 128 then completes 210 the SSL handshake in order to establish an SSL session.

FIG. 2A illustrates in greater detail the operation of the SSL server 128 in some embodiments. In step 202A of the method 200A, the SSL server 128 receives 202A an SSL session request from an SSL client. In response to receiving the SSL session request, the SSL server 128 identifies 204A the port at which the request was received.

If the request was received at the certificate port 132, it may be inferred that the request was sent from an SSL client that is going to use certificate-based authentication, such as the SSL client 124 on the administrative system 102. Therefore, the SSL server 128 requests 206A a certificate from the SSL client.

The SSL client may choose not to present a certificate. The SSL server 128 determines 208A whether the SSL client has presented a certificate. If the SSL client has presented a certificate, then the SSL server 128 determines 210A whether the certificate has been authenticated. If so, then the SSL server 128 proceeds 212A with an authenticated SSL session with the SSL client.

If in step 208A the SSL client does not present a certificate, then the SSL server 128 determines 214A whether the SSL session may be allowed to continue using another authentication mechanism, such as an operating system-specific authentication mechanism. If another authentication mechanism may not be used, then the SSL session ends 216A in error.

If in step 214A it is determined that another authentication mechanism may be used, then the SSL server attempts 218A another authentication mechanism (e.g., an operating system-specific authentication mechanism) and determines 220A whether the SSL client was successfully authenticated via the other authentication mechanism. If so, then the SSL server 128 proceeds 222A with an authenticated SSL session with the SSL client.

If in step 220A it is determined that the SSL client was not successfully authenticated via the other authentication mechanism, then the SSL server determines 224A whether the SSL session may be allowed to proceed without authentication. If so, the SSL server proceeds 226A with a non-authenticated SSL session. However, if the SSL session is not allowed to proceed without authentication, then the SSL session ends 216A in error.

If in step 210A the certificate presented by the SSL client is not authenticated, the SSL server 128 determines 214A whether the SSL session may be allowed to continue using another authentication mechanism, such as an operating system-specific authentication mechanism. More specifically, the method 200A continues to step 214A and proceeds as described above.

If in step 204A the request for an SSL session was received at the non-certificate port 134, it may be inferred that the request was sent from an SSL client that is not going to use certificate-based authentication, such as the SSL client 126 on the console system 116. Therefore, the SSL server 128 does not request a certificate from the SSL client. Instead, the SSL server 128 attempts another type of authentication mechanism. More specifically, the method 200A continues to step 218A and proceeds as described above.

Figure 3:
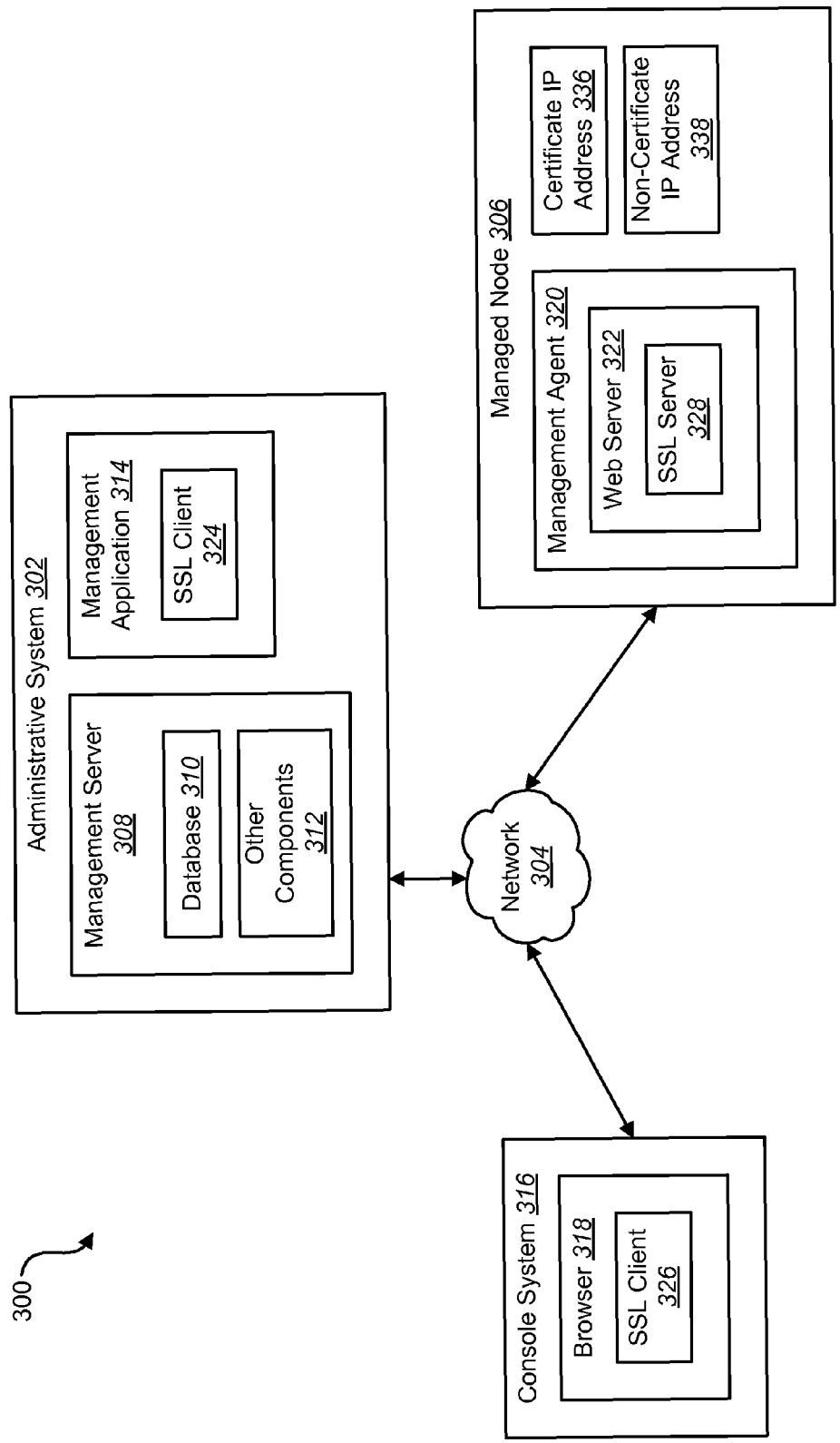
FIG. 3 illustrates another exemplary system in which some embodiments may be practiced.

FIG. 3 illustrates another exemplary system 300 in which some embodiments may be practiced. As before, the system 300 includes an administrative system 302, a console system 316, and a managed node 306 that are connected to a computer network 304. The administrative system 302 includes a management server 308, which may include a database 310 and other components 312. The administrative system 302 also includes a management application 314, which includes an SSL client 324. The managed node 306 includes a management agent 320, which includes a web server 322. An SSL server 328 is included within the web server 322. The console system 316 includes a browser 318, which includes an SSL client 326. These components function in a similar manner to the corresponding components shown in FIG. 1 and described in connection therewith.

As before, the SSL server 328 selectively requests certificates from SSL clients. More specifically, if an SSL session is being established with the SSL client 324 on the administrative system 302, the SSL server 328 requests a certificate from the SSL client 324. However, if an SSL session is being established with the SSL client 326 on the console system 316, the SSL server 328 does not request a certificate from the SSL client 326.

In the illustrated embodiment, this functionality is achieved by assigning two IP addresses to the managed node 306, and then designating different IP addresses to receive different types of SSL session requests. In particular, one IP address 336 is designated to receive SSL session requests from SSL clients that will use certificate-based authentication, such as the SSL client 324 on the administrative system 302. This IP address 336 may be referred to herein as a certificate IP address 336. In addition, another IP address 338 is designated to receive SSL session requests from SSL clients that will not use certificate-based authentication, such as the SSL client 326 on the console system 316. This IP address 338 may be referred to herein as a non-certificate IP address 338.

The SSL clients 324, 326 within the system 300 are configured to send SSL session requests to the appropriate IP address for the type of authentication that will be used. More specifically, the SSL client 324 on the administrative system 302 is configured to send SSL session requests to the certificate IP address 336. The SSL client 326 on the console system 316 is configured to send SSL session requests to the non-certificate IP address 338.

Figure 4:
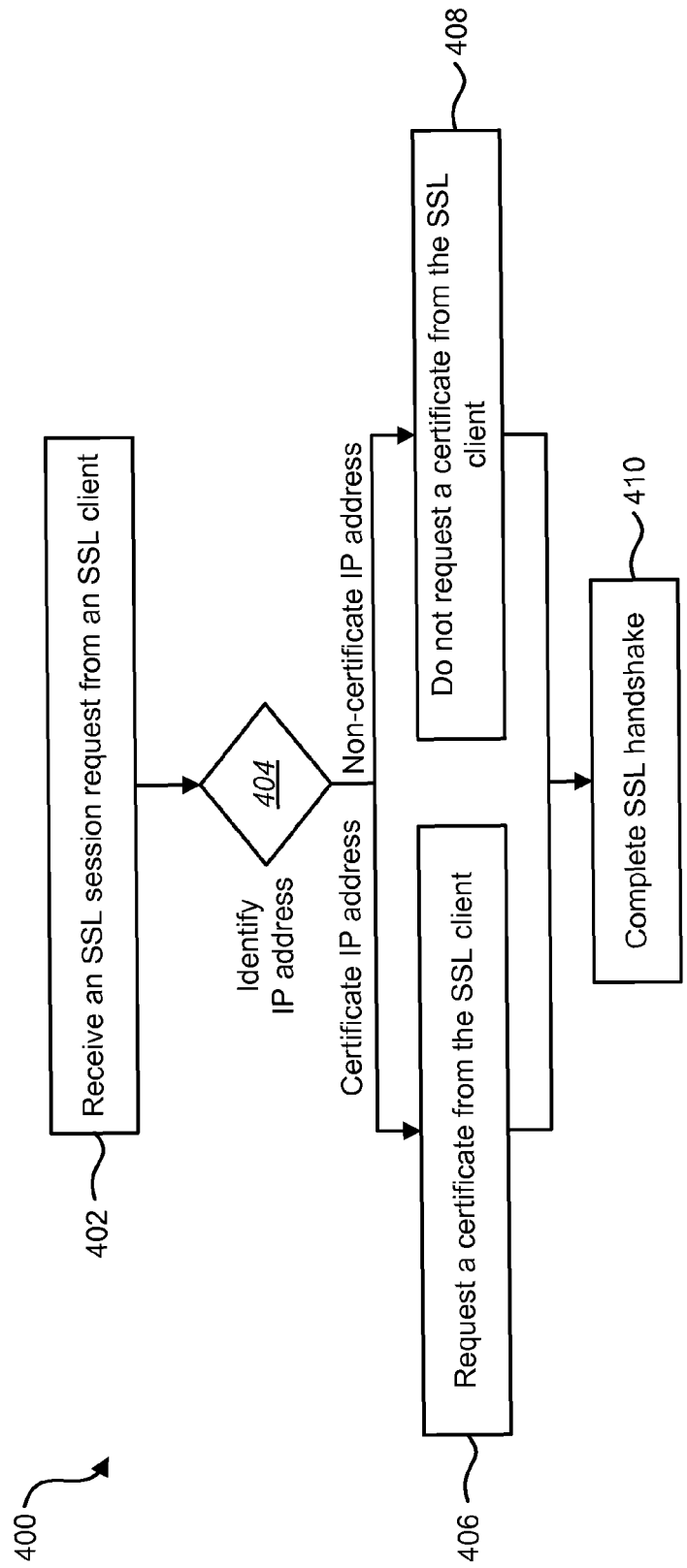
FIG. 4 illustrates an exemplary method that may be performed by the SSL server in the system of FIG. 3 when an SSL session request is received from an SSL client.

FIG. 4 illustrates an exemplary method 400 that may be performed by the SSL server 328 when an SSL session request is received 402 from an SSL client. In response to receiving the SSL session request, the SSL server 328 identifies 404 the IP address at which the request was received.

If the request was received at the certificate IP address 336, it may be inferred that the request was sent from an SSL client that is going to use certificate-based authentication, such as the SSL client 324 on the administrative system 302. Therefore, the SSL server 328 requests 406 a certificate from the SSL client. However, if the request was received at the non-certificate IP address 338, it may be inferred that the request was sent from an SSL client that is not going to use certificate-based authentication, such as the SSL client 326 on the console system 316. Therefore, the SSL server 328 does not request 408 a certificate from the SSL client. The SSL server 328 then completes 410 the SSL handshake in order to establish an SSL session.

Figure 5:
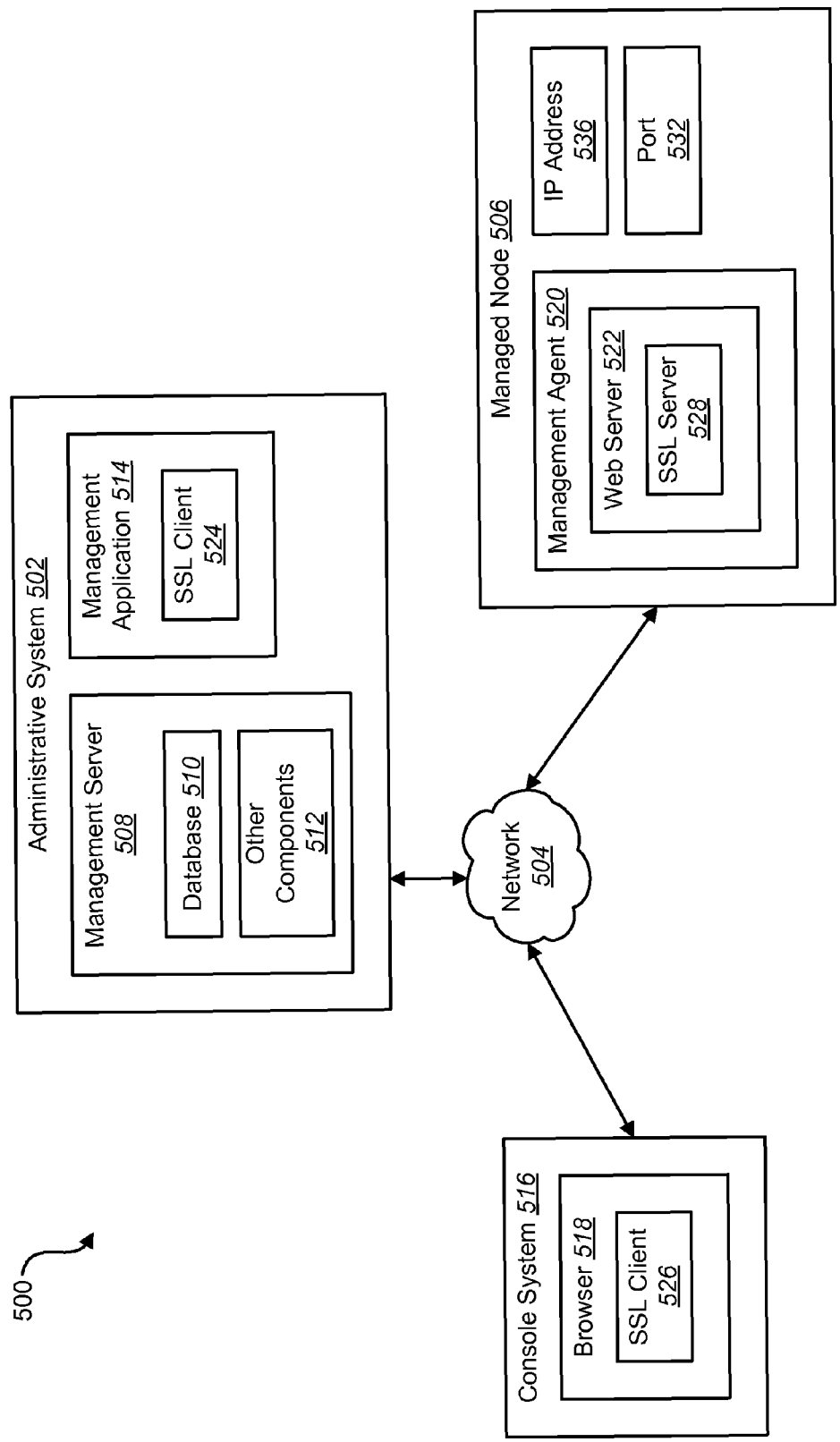
FIG. 5 illustrates another exemplary system in which some embodiments may be practiced.

FIG. 5 illustrates another exemplary system 500 in which some embodiments may be practiced. As before, the system 500 includes an administrative system 502, a console system 516, and a managed node 506 that are connected to a computer network 504. The administrative system 502 includes a management server 508, which includes a database 510 and other components 512. The administrative system 502 also includes a management application 514, which includes an SSL client 524. The managed node 506 includes a management agent 520, which includes a web server 522. An SSL server 528 is included within the web server 522. The console system 516 includes a browser 518, which includes an SSL client 526. These components function in a similar manner to the corresponding components shown in FIG. 1 and described in connection therewith.

As before, the SSL server 528 selectively requests certificates from SSL clients. More specifically, if an SSL session is being established with the SSL client 524 on the administrative system 502, the SSL server 528 requests a certificate from the SSL client 524. However, if an SSL session is being established with the SSL client 526 on the console system 516, the SSL server 528 does not request a certificate from the SSL client 526.

In the illustrated embodiment, this functionality is achieved by altering the content of the SSL session request message that is sent to the SSL server 528. Unlike embodiments described previously, in the illustrated embodiment only a single IP address 536 is assigned to the managed node 506. In addition, only a single port 532 is designated to receive SSL session requests from SSL clients. The SSL clients 524, 526 within the system 500 are configured to send different types of SSL session requests to the same IP address 536 and to the same port 532.

Figure 6:
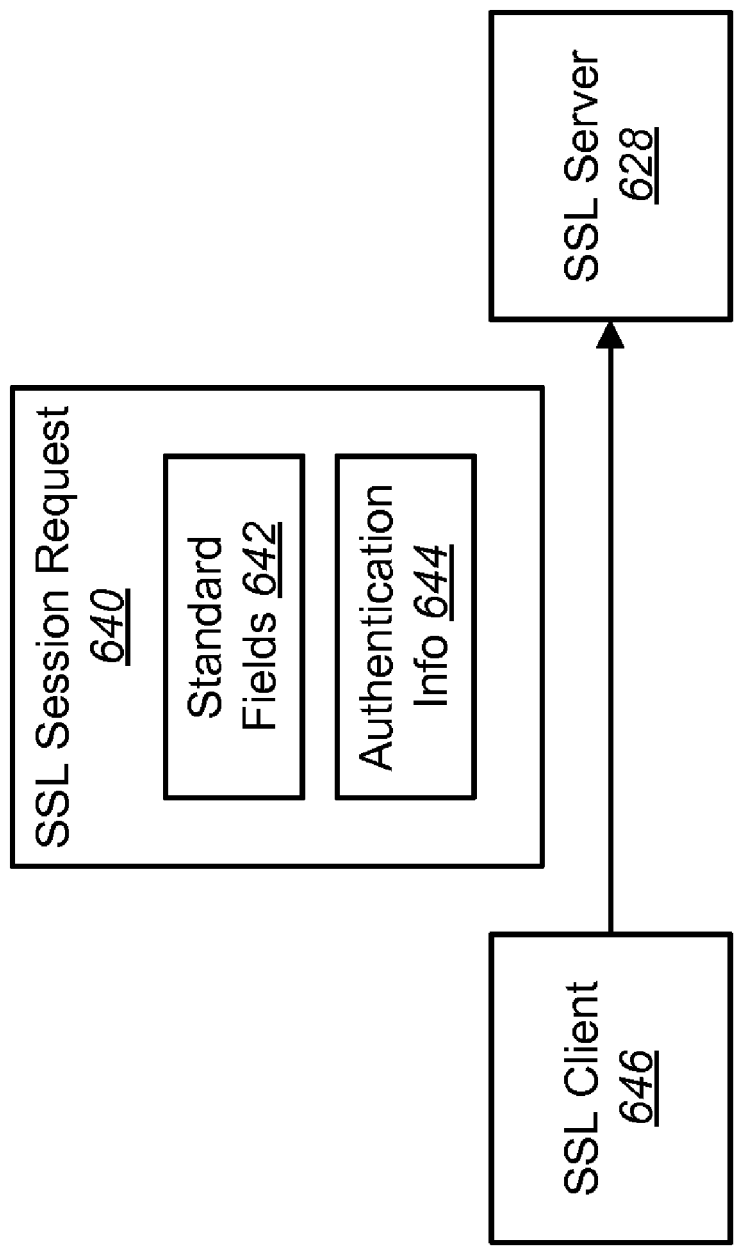
FIG. 6 illustrates an SSL session request being sent from an SSL client to an SSL server.

FIG. 6 illustrates an SSL session request 640 being sent from an SSL client 646 to an SSL server 628. The SSL client 646 may be located on a console system (not shown in FIG. 6) or an administrative system (not shown in FIG. 6). The SSL server 628 may be located on a managed node (not shown in FIG. 6).

The SSL session request 640 includes standard fields 642 that conform to the SSL protocol. The standard fields 642 may indicate the version of the SSL protocol that the SSL client 646 is following, the SSL client's 646 preferences with respect to compression and cryptographic algorithms, and so forth.

In addition, the SSL session request 640 includes authentication information 644. The authentication information 644 indicates whether the SSL client 646 is going to authenticate by using a certificate or by using some other means of authentication. The authentication information 644 is not currently provided in known SSL session requests.

Figure 7:
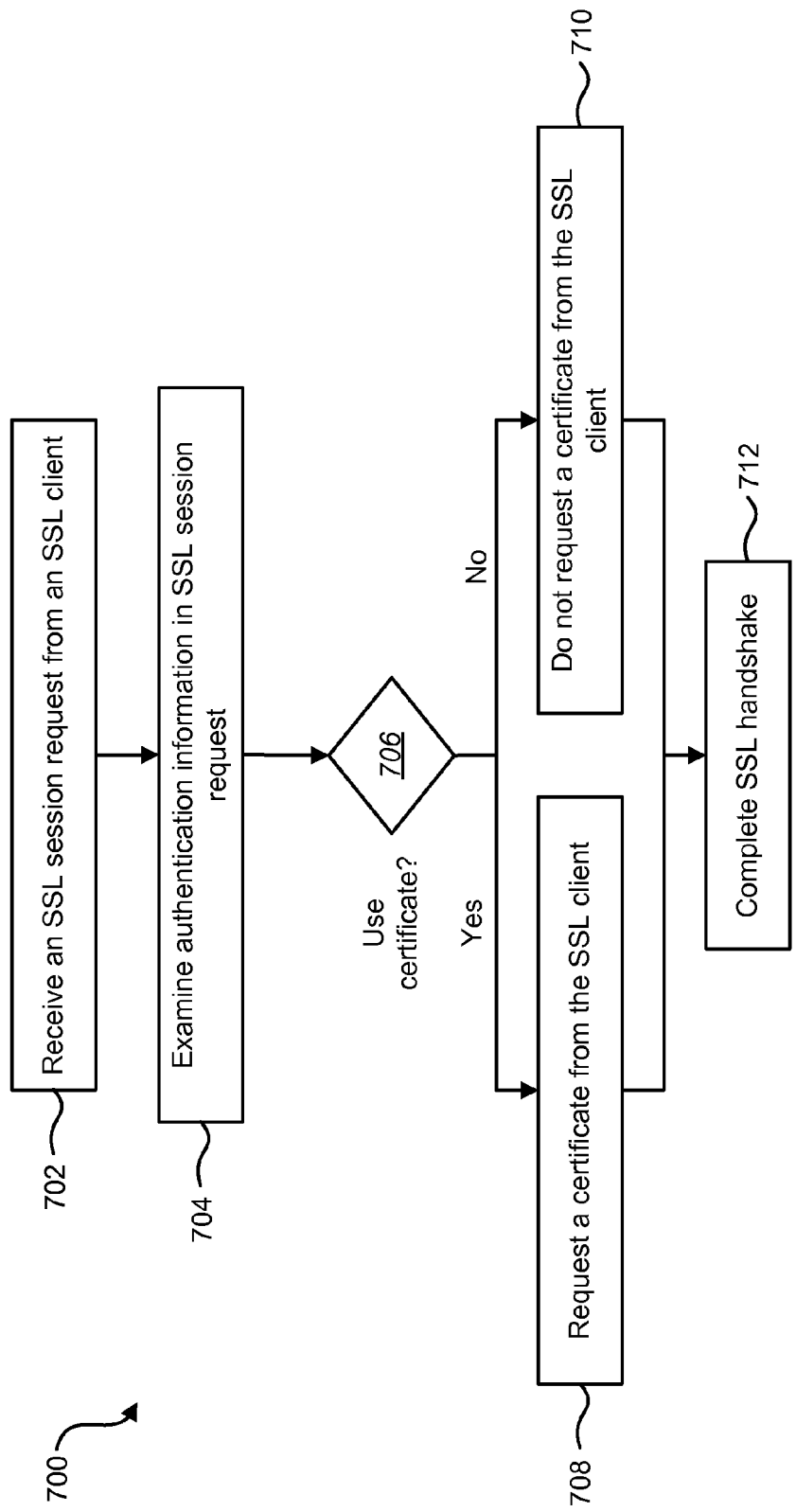
FIG. 7 illustrates an exemplary method that may be performed by the SSL server in the system of FIG. 5 when an SSL session request is received from an SSL client.

FIG. 7 illustrates an exemplary method 700 that may be performed by the SSL server 628 when the SSL session request 640 is received 702 from the SSL client 646. In response to receiving the SSL session request 640, the SSL server 628 examines 704 the authentication information 644 in the request 640 in order to determine 706 whether the SSL client 646 is going to authenticate by using a certificate or by using some other means of authentication.

If the authentication information 644 indicates that the SSL client 646 is going to authenticate by using a certificate, the SSL server 628 requests 708 a certificate from the SSL client 646. However, if the authentication information 644 indicates that the SSL client 646 is going to authenticate by some other mechanism, the SSL server 628 does not request 710 a certificate from the SSL client 646. The SSL server 628 then completes 712 the SSL handshake in order to establish an SSL session.

In view of the foregoing, the embodiments disclosed herein offer several advantages not available in conventional approaches. An SSL server is disclosed that is able to selectively request certificates from SSL clients during initiation of SSL sessions. When the SSL server receives an SSL session request from an SSL client that is not going to authenticate by using a certificate, the SSL server does not request a certificate from the SSL client. In many cases, this improves the experience of the user of the system on which the SSL client is running, because the user is not unnecessarily prompted to select a certificate. However, when the SSL server receives an SSL session request from an SSL client that is going to authenticate by using a certificate, the SSL server requests a certificate from the SSL client. Therefore, the SSL server is configured so that SSL clients may use certificate-based authentication when it is possible and/or appropriate to do so.

Figure 8:
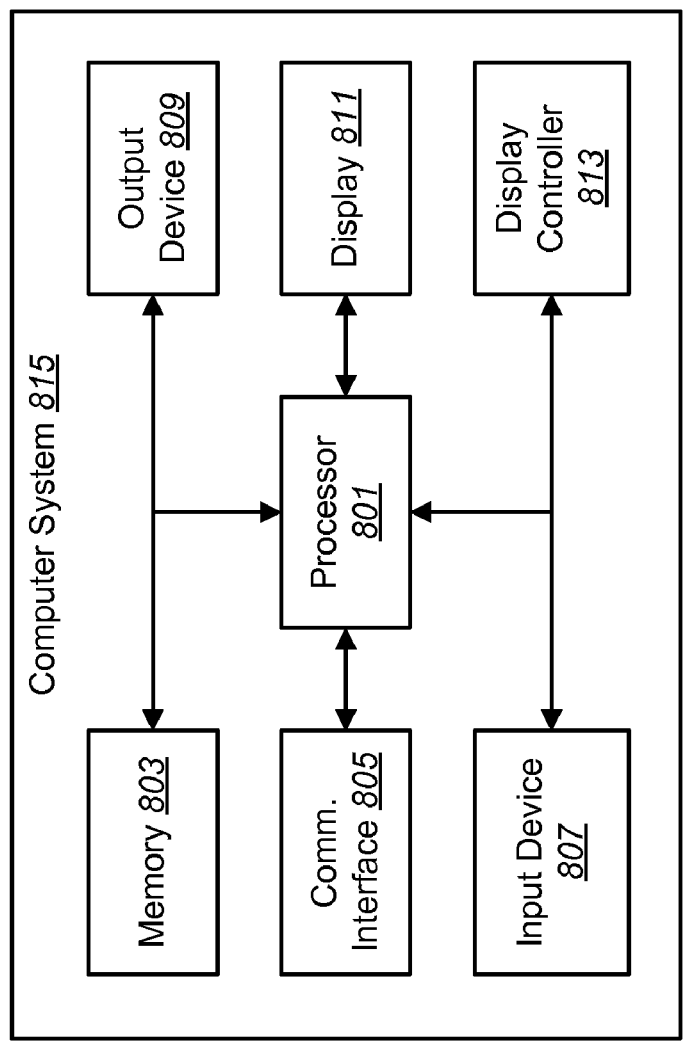
FIG. 8 is a block diagram illustrating the major hardware components typically utilized in a computer system.

FIG. 8 is a block diagram illustrating the major hardware components typically utilized in a computer system 815, such as an administrative system, a console system, and/or a managed node. The illustrated components may be located within the same physical structure or in separate housings or structures.

The computer system 815 includes a processor 801 and memory 803. The processor 801 controls the operation of the computer system 815 and may be embodied as a microprocessor, a microcontroller, a digital signal processor (DSP) or other device known in the art. The processor 801 typically performs logical and arithmetic operations based on program instructions stored within the memory 803.

As used herein, the term memory 803 is broadly defined as any electronic component capable of storing electronic information, and may be embodied as read only memory (ROM), random access memory (RAM), magnetic disk storage media, optical storage media, flash memory devices in RAM, on-board memory included with the processor 801, EPROM memory, EEPROM memory, registers, etc. The memory 803 typically stores program instructions and other types of data. The program instructions may be executed by the processor 801 to implement some or all of the methods disclosed herein.

The computer system 815 typically also includes one or more communication interfaces 805 for communicating with other electronic devices. The communication interfaces 805 may be based on wired communication technology, wireless communication technology, or both. Examples of different types of communication interfaces 805 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 815 typically also includes one or more input devices 807 and one or more output devices 809. Examples of different kinds of input devices 807 include a keyboard, mouse, microphone, remote control device, button, joystick, trackball, touchpad, lightpen, etc. Examples of different kinds of output devices 809 include a speaker, printer, etc. One specific type of output device which is typically included in a computer system is a display device 811. Display devices 811 used with embodiments disclosed herein may utilize any suitable image projection technology, such as a cathode ray tube (CRT), liquid crystal display (LCD), light-emitting diode (LED), gas plasma, electroluminescence, or the like. A display controller 813 may also be provided, for converting data stored in the memory 803 into text, graphics, and/or moving images (as appropriate) shown on the display device 811.

Of course, FIG. 8 illustrates only one possible configuration of a computer system. Those skilled in the art will recognize that various other architectures and components may be utilized.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. In a computer system, a method for selectively requesting certificates during initiation of secure communication sessions, the method comprising:

receiving from a client a request to initiate a secure communication session, wherein the secure communication session is a secure sockets layer session;

determining whether the client is going to use certificate-based authentication before any certificate is requested from the client, wherein the determination is made by identifying a location where the request to initiate the secure communication session was received, wherein the identified location is one of at least two possible locations, wherein the at least two possible locations comprise a port, wherein determining whether the client is going to use certificate-based authentication comprises identifying the port at which the request was received, wherein a first location of the at least two possible locations receives requests to initiate the secure communication session via certificate-based authentication, and wherein a second location of the at least two possible locations receives requests to initiate the secure communication session via another authentication mechanism;

if the client is going to use certificate-based authentication, requesting a certificate from the client; and if the client is not going to use certificate-based authentication, attempting to authenticate using another authentication mechanism besides certificate-based authentication, not requesting the certificate from the client, and also preventing a dialog box from being displayed that indicates that the certificate should be selected, wherein the other authentication mechanism comprises an operating system-specific authentication mechanism.

2. In a computer system, a method for selectively requesting certificates during initiation of secure communication sessions, the method comprising:

receiving from a client a request to initiate a secure communication session, wherein the secure communication session is a secure sockets layer session;

determining whether the client is going to use certificate-based authentication before any certificate is requested from the client, wherein the determination is made by identifying a location where the request to initiate the secure communication session was received, wherein the identified location is one of at least two possible locations, wherein the at least two possible locations comprise an IP address, wherein determining whether the client is going to use certificate-based authentication comprises identifying the IP address at which the request was received, wherein a first location of the at least two possible locations receives requests to initiate the secure communication session via certificate-based authentication, and wherein a second location of the at least two possible locations receives requests to initiate the secure communication session via another authentication mechanism;
if the client is going to use certificate-based authentication, requesting a certificate from the client;
if the client is not going to use certificate-based authentication, not requesting the certificate from the client, wherein the other authentication mechanism comprises an operating system-specific authentication mechanism; and
wherein determining whether the client is going to use certificate-based authentication comprises determining whether the request was received at a certificate IP address or a non-certificate IP address.

3. The method of claim 1, wherein the computer system is a managed node in a computer network.

4. The method of claim 1, wherein the computer system is connected to a computer network, and wherein the client is located on an administrative system for the computer network.

5. The method of claim 4, wherein the client is included in a management application on the administrative system.

6. The method of claim 1, wherein the computer system is connected to a computer network, and wherein the client is located on a console system that is also connected to the computer network.

7. The method of claim 6, wherein the client is included in a browser on the console system.

8. A computer system that is configured to selectively request certificates during initiation of secure communication sessions, the computer system comprising:
a processor;
memory in electronic communication with the processor;
instructions stored in the memory, the instructions being executable to:
receive from a client a request to initiate a secure communication session;
determine whether the client is going to use certificate-based authentication before any certificate is requested from the client, wherein the determination is made by identifying a location where the request to initiate the secure communication session was received, wherein the identified location is one of at least two possible locations, wherein a first location of the at least two possible locations receives requests to initiate the secure communication session via certificate-based authentication, and wherein a second location of the at least two possible locations receives requests to initiate the secure communication session via another authentication mechanism;
if the client is going to use certificate-based authentication, request a certificate from the client;
if the client is not going to use certificate-based authentication, attempt to authenticate using another authentication mechanism besides certificate-based authentication, not request the certificate from the client, and also prevent a dialog box from being displayed that indicates that the certificate should be selected, wherein the other authentication mechanism comprises an operating system-specific authentication mechanism;
wherein the at least two possible locations comprise at least one certificate port that is designated to receive secure communication session requests from clients that will use certificate-based authentication; and
wherein the at least two possible locations comprise at least one non-certificate port that is designated to receive secure communication session requests from clients that will not use certificate-based authentication.

9. The computer system of claim 8, wherein the instructions are executable to determine whether the client is going to use certificate-based authentication comprises determining whether the request was received at a certificate port or a non-certificate port.

10. A computer system that is configured to selectively request certificates during initiation of secure communication sessions, the computer system comprising:
a processor;
memory in electronic communication with the processor;
instructions stored in the memory, the instructions being executable to:
receive from a client a request to initiate a secure communication session;
determine whether the client is going to use certificate-based authentication before any certificate is requested from the client, wherein the determination is made by identifying a location where the request to initiate the secure communication session was received, wherein the identified location is one of at least two possible locations, wherein a first location of the at least two possible locations receives requests to initiate the secure communication session via certificate-based authentication, and wherein a second location of the at least two possible locations receives requests to initiate the secure communication session via another authentication mechanism;
if the client is going to use certificate-based authentication, request a certificate from the client;
if the client is not going to use certificate-based authentication, not request the certificate from the client, wherein the other authentication mechanism comprises an operating system-specific authentication mechanism;
wherein the at least two possible locations comprise at least one certificate IP address that is designated to receive secure communication session requests from clients that will use certificate-based authentication;
wherein the at least two possible locations further comprise at least one non-certificate IP address that is designated to receive secure communication session requests from clients that will not use certificate-based authentication; and
wherein the instructions are executable to determine whether the client is going to use certificate-based authentication comprises determining whether the request was received at a certificate IP address or a non-certificate IP address.

11. A non-transitory computer-readable medium comprising executable instructions for selectively requesting certificates during initiation of secure communication sessions, the instructions being executable to:
receive from a client a request to initiate a secure communication session;
determine whether the client is going to use certificate-based authentication before any certificate is requested from the client, wherein the determination is made by examining where the request to initiate the secure communication session was received, wherein the identified location is one of at least two possible locations, wherein a first location of the at least two possible locations receives requests to initiate the secure communication session via certificate-based authentication, and wherein a second location of the at least two possible locations receives requests to initiate the secure communication session via another authentication mechanism;

if the client is going to use certificate-based authentication, request a certificate from the client; and if the client is not going to use certificate-based authentication, attempt to authenticate using another authentication mechanism besides certificate-based authentication, not request the certificate from the client, and also prevent a dialog box from being displayed that indicates that the certificate should be selected, wherein the other authentication mechanism comprises an operating system-specific authentication mechanism;

wherein the at least two possible locations comprise a port, wherein determining whether the client is going to use certificate-based authentication comprises identifying the port at which the request was received.

12. A non-transitory computer-readable medium comprising executable instructions for selectively requesting certificates during initiation of secure communication sessions, the instructions being executable to:

receive from a client a request to initiate a secure communication session;

determine whether the client is going to use certificate-based authentication before any certificate is requested from the client, wherein the determination is made by examining where the request to initiate the secure communication session was received, wherein the identified location is one of at least two possible locations, wherein a first location of the at least two possible locations receives requests to initiate the secure communication session via certificate-based authentication, and wherein a second location of the at least two possible locations receives requests to initiate the secure communication session via another authentication mechanism;

if the client is going to use certificate-based authentication, request a certificate from the client;

if the client is not going to use certificate-based authentication, not request the certificate from the client, wherein the other authentication mechanism comprises an operating system-specific authentication mechanism; and wherein the at least two possible locations comprise an IP address, wherein determining whether the client is going to use certificate-based authentication comprises identifying the IP address at which the request was received, wherein determining whether the client is going to use certificate-based authentication comprises determining whether the request was received at a certificate IP address or a non-certificate IP address.

13. The method of claim 1, further comprising:

if the client presents the certificate during certificate-based authentication but is not successfully authenticated, attempting to authenticate the client via the operating system-specific authentication mechanism; and if the client is not successfully authenticated via the operating system-specific authentication mechanism, determining whether the client is allowed to proceed without authentication.

14. The method of claim 1, wherein the request to initiate a secure communication session includes authentication information indicating whether the client is going to authenticate by using certificate-based authentication or whether the client is going to authenticate via another authentication mechanism.

* * * * *

UNITED STATES PATENT AND TRADEMARK OFFICE
CERTIFICATE OF CORRECTION

| | | |
|---|---|---|
| PATENT NO. | : 8,185,945 B1 | Page 1 of 1 |
| APPLICATION NO. | : 11/070475 | |
| DATED | : May 22, 2012 | |
| INVENTOR(S) | : David A. Eatough et al. | |

It is certified that error appears in the above-identified patent and that said Letters Patent is hereby corrected as shown below:

In column 8, line 35 please delete "LP" and replace it with --IP--.

Signed and Sealed this
Eighteenth Day of December, 2012

David J. Kappos
*Director of the United States Patent and Trademark Office*